United States Patent
Schonwald et al.

(10) Patent No.: US 10,094,383 B2
(45) Date of Patent: Oct. 9, 2018

(54) MOTOR VEHICLE VACUUM PUMP HAVING AN ADHESIVE

(71) Applicant: Magna Powertrain Huckeswagen GmbH, Huckeswagen (DE)

(72) Inventors: Freddy Schonwald, Huckeswagen (DE); Benjamin Pyrdok, Bergisch Gladbach (DE); Jurgen Jakubowski, Hemsbach (DE); Daniel Ziehr, Remscheid (DE); Carsten Sczesny, Bochum (DE)

(73) Assignee: Magna Powertrain Bad Homburg GmbH, Bad Homburg (DE)

( * ) Notice: Subject to any disclaimer, the term of this patent is extended or adjusted under 35 U.S.C. 154(b) by 0 days.

(21) Appl. No.: 15/303,113

(22) PCT Filed: Feb. 20, 2015

(86) PCT No.: PCT/EP2015/053577
§ 371 (c)(1),
(2) Date: Oct. 10, 2016

(87) PCT Pub. No.: WO2015/154907
PCT Pub. Date: Oct. 15, 2015

(65) Prior Publication Data
US 2017/0037851 A1    Feb. 9, 2017

(30) Foreign Application Priority Data
Apr. 11, 2014   (DE) .................. 10 2014 207 023

(51) Int. Cl.
*F04C 29/06*    (2006.01)
*F01C 21/10*    (2006.01)
(Continued)

(52) U.S. Cl.
CPC .......... *F04C 29/065* (2013.01); *B60T 13/567* (2013.01); *F01C 21/10* (2013.01);
(Continued)

(58) Field of Classification Search
CPC ....... F04D 29/663; F04D 29/665; H02K 5/24; F04B 39/0027; F04B 39/0044;
(Continued)

(56) References Cited

U.S. PATENT DOCUMENTS 3,692,335 A * 9/1972 Vickers .................. F02F 7/006
181/200
3,773,142 A * 11/1973 Bragg ..................... F02B 77/13
123/198 E (Continued)

FOREIGN PATENT DOCUMENTS

CN    102943759 A    2/2013
CN    103306979 A    9/2013
(Continued)

OTHER PUBLICATIONS

International Search Report and Written Opinion dated May 13, 2015 from International Patent Application No. PCT/EP2015/053577 (with English translation of International Search Report).
(Continued)

*Primary Examiner* — Edgardo San Martin
(74) *Attorney, Agent, or Firm* — Dickinson Wright PLLC

(57) ABSTRACT

The invention relates to a motor vehicle vacuum pump having a pump housing surface, on which a noise absorption cap is mounted, said cap defining a noise damping volume.

19 Claims, 2 Drawing Sheets

(51) Int. Cl.
  *F04C 25/02* (2006.01)
  *F04C 27/00* (2006.01)
  *B60T 13/567* (2006.01)
  *F04C 18/34* (2006.01)
  *G10K 11/16* (2006.01)
  *F04C 29/00* (2006.01)

(52) U.S. Cl.
  CPC ............ *F04C 18/34* (2013.01); *F04C 25/02* (2013.01); *F04C 27/008* (2013.01); *F04C 29/06* (2013.01); *G10K 11/16* (2013.01); F04C 2220/10 (2013.01); F04C 2230/20 (2013.01); F04C 2230/60 (2013.01); F04C 2240/30 (2013.01); F04C 2240/40 (2013.01); F04C 2240/805 (2013.01); F05C 2231/00 (2013.01); F05C 2253/00 (2013.01)

(58) Field of Classification Search
  CPC ............ F04B 39/0072; F04B 39/0061; F04B 39/0088; F04B 39/0033; F16F 15/04; F16F 9/306; F04C 29/065; F04C 29/066; F04C 2240/30; F04C 2240/805
  See application file for complete search history.

(56) References Cited

U.S. PATENT DOCUMENTS

| | | | | |
|---|---|---|---|---|
| 3,822,763 A * | 7/1974 | Adams et al. | ........ | F02B 77/13 123/198 E |
| 4,066,058 A * | 1/1978 | Anderkay | ........ | B62D 25/12 123/198 E |
| 4,394,853 A * | 7/1983 | Lopez-Crevillen | ........ | F01M 11/0004 123/195 C |
| 4,781,545 A * | 11/1988 | Yokomizo | ........ | F04C 29/061 181/230 |
| 5,858,509 A * | 1/1999 | Polch | ........ | G11B 33/08 181/207 |
| 6,279,679 B1 * | 8/2001 | Thomasen | ........ | F16F 7/116 181/199 |
| 6,491,505 B1 * | 12/2002 | Hueser | ........ | F04C 23/00 417/312 |
| 8,479,876 B2 * | 7/2013 | Fetsko | ........ | B60R 13/08 181/207 |
| 9,845,681 B2 * | 12/2017 | Ziehr | ........ | F01C 21/10 |
| 2004/0170516 A1 * | 9/2004 | Hinchey, Jr. | ........ | F04C 29/065 418/23 |
| 2005/0063853 A1 * | 3/2005 | Otte | ........ | F04C 29/063 418/181 |
| 2008/0008612 A1 * | 1/2008 | Kim | ........ | F04C 18/0215 418/55.1 |
| 2011/0171041 A1 * | 7/2011 | Zhao | ........ | F04C 18/3442 417/65 |
| 2015/0345498 A1 * | 12/2015 | Ziehr | ........ | F01C 21/10 418/228 |
| 2016/0201671 A1 * | 7/2016 | Moeser | ........ | F01C 21/10 418/259 |

FOREIGN PATENT DOCUMENTS

| | | |
|---|---|---|
| DE | 4239575 A1 | 5/1994 |
| EP | 1074743 A2 | 2/2001 |
| FR | 2832769 A1 | 5/2003 |
| JP | S5138149 U | 3/1976 |
| JP | 2013241907 A | 12/2013 |
| WO | WO2011134448 A2 | 11/2011 |

OTHER PUBLICATIONS

Search Report dated May 5, 2017 from corresponding Chinese Patent Application No. 2015800193100.
Notice of Reasons for Rejection dated Oct. 24, 2017 in corresponding Japanese patent application No. 2017-504243 (with English translation).

* cited by examiner

MOTOR VEHICLE VACUUM PUMP HAVING AN ADHESIVE

CROSS-REFERENCE TO RELATED APPLICATIONS

This application is a U.S. National Stage of International Application No. PCT/EP2015/053577, filed Feb. 20, 2015 and which claims priority to German Application No. 10 2014 207 023.6 filed Apr. 11, 2014. The entire disclosure of each of the above listed applications is incorporated herein by reference.

FIELD

The invention relates to a motor vehicle vacuum pump having a pump housing surface, on which a noise absorption cap is mounted, said cap defining a noise damping volume.

BACKGROUND

As part of ever stricter regulations relating to environmental protection, motor vehicle manufacturers are being compelled to design engines to be efficient and to have a low consumption. An automatic start-stop system is already available in almost all vehicles. Moreover, there is increasingly the possibility of switching off the internal combustion engine while coasting.

With such switching concepts for the internal combustion engine, it is hardly possible to use a mechanical vacuum pump for servo assistance of the braking force. There is therefore a demand for electric vacuum pumps for modern applications. These vacuum pumps often run dry since it is also no longer possible to supply the vacuum pump with oil in a manner dependent on a running internal combustion engine.

The absence of the engine noise of the internal combustion engine brings the operating noise of the vacuum pumps to the fore in terms of what is audible. In order to minimize these operating noises, various measures are implemented in order to reduce structure borne noise and airborne noise.

The publication WO 2011/134448 A2 discloses a vacuum pump having a pump housing, in which pump at least one pump housing part is formed by a sandwich-type sheet metal material comprising two sheet metal layers, between which is arranged a plastic layer, by means of which the sheet metal layers are vibrationally decoupled from one another. The vacuum pump can comprise a muffler, which is formed from the sandwich-type sheet metal material. Vacuum pumps having noise absorption caps are known from PCT/DE2013/100370 (not a prior publication). In addition, a multifunctional decoupling element is arranged between the pump housing surface and the noise absorption cap, said cap performing a sealing function and, in this prior art, also a valve function in addition to a noise decoupling function.

The decoupling element serves to decouple the noise absorption cap acoustically, particularly in respect of vibrations and/or structure borne noise occurring during the operation of the motor vehicle vacuum pump. By virtue of the acoustic decoupling of the noise absorption cap brought about by means of the decoupling element, unwanted development of noise during the operation of the motor vehicle vacuum pump can be considerably reduced. The decoupling element also forms a seal between the pump housing surface and the noise absorption cap with respect to the environment of the motor vehicle vacuum pump. A separate seal between the pump housing surface and the noise absorption cap can thus be omitted.

However, it is not possible, using the measures of damping the airborne noise by means of the noise absorption cap and damping the structure borne noise by means of the decoupling element, for all the structure borne noise to be suppressed and, specifically, for the noise peaks at the resonant frequencies to be reduced.

It is an object of the invention to further optimize a motor vehicle vacuum pump having a pump housing surface, on which a noise absorption cap defining a noise damping volume is mounted, in respect of unwanted development of noise during the operation of the motor vehicle vacuum pump.

SUMMARY

The object is achieved by means of a motor vehicle vacuum pump having a pump housing surface, on which a noise absorption cap is mounted, said cap defining a noise damping volume, wherein a double-sided adhesive connector is arranged between the pump housing surface and the noise absorption cap, said adhesive connector performing both a sealing function and a connecting function between the pump housing surface and the noise absorption cap in addition to a noise decoupling function.

For simplicity of assembly, it is advantageous here that the double-sided adhesive connector (60) is formed integrally from a viscoelastic material.

The use of a double-sided adhesive connector (60) made from an acrylate has proven particularly advantageous here.

It is advantageous here that the double-sided adhesive connector is of annular design. In this case, it is not at all essential that the annular adhesive connector should follow the contour of the components to be connected, allowing the use of adhesive connectors of standard dimensions.

The double-sided adhesive connector is advantageously of almost circular design.

To increase the fastening area, it is advantageous that the noise absorption cap for the double-sided adhesive connector has surfaces for adhesive bonding and/or fastening lugs on the pump cover and on the noise absorption cap.

It is advantageous that the double-sided adhesive connector is embodied and arranged in such a way that the noise absorption cap is acoustically decoupled from the pump housing surface and, in this way, the structure borne noise can be minimized.

The embodiment in which the double-sided adhesive connector, the noise absorption cap and the pump housing surface differ in hardness in such a way that the noise absorption cap is substantially vibrationally decoupled from the pump housing surface and thus also compensates tolerances as regards deviations from the flatness of the surfaces to be joined is particularly advantageous.

DESCRIPTION OF THE DRAWINGS

Further advantages, features and details of the invention will become apparent from the following description, in which various illustrative embodiments are described in detail with reference to the drawing, in which.

DETAILED DESCRIPTION

Figure 1:
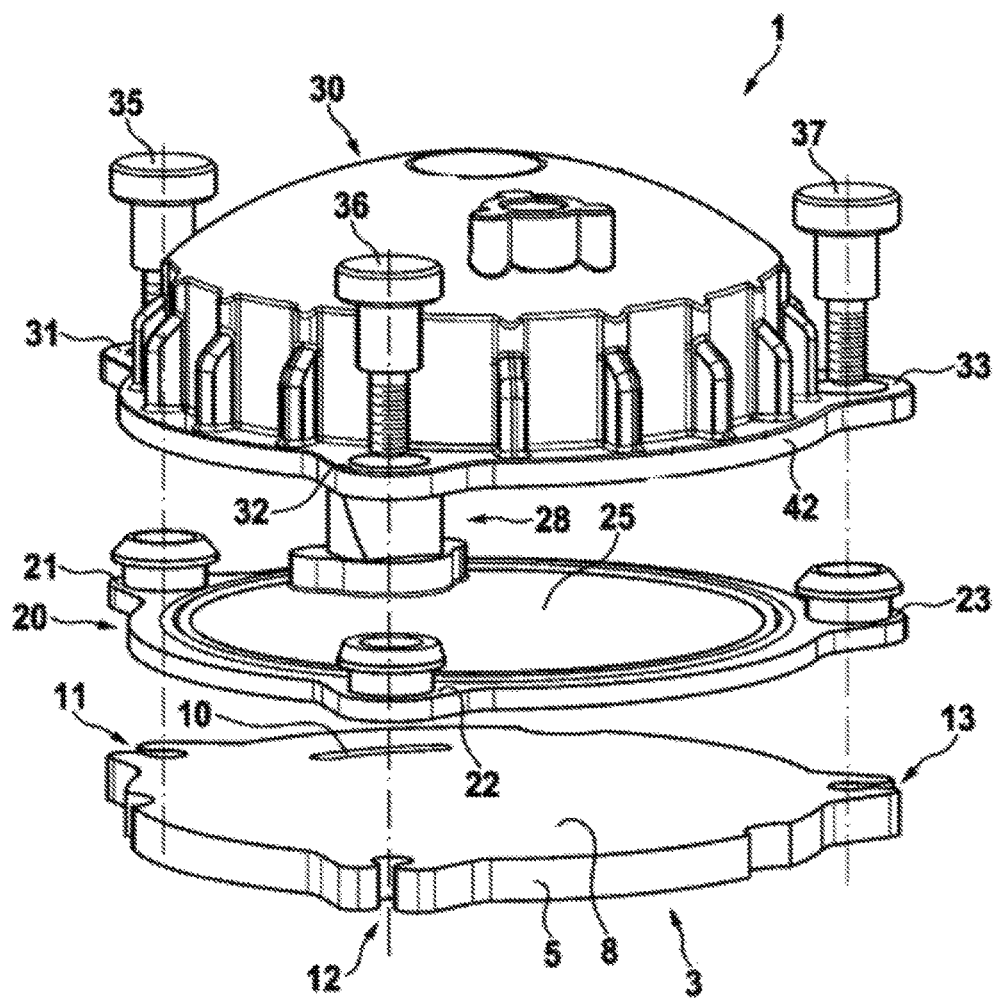
FIG. 1 shows an exploded view of a noise absorption cap of a motor vehicle vacuum pump in the prior art.
Figure 2:
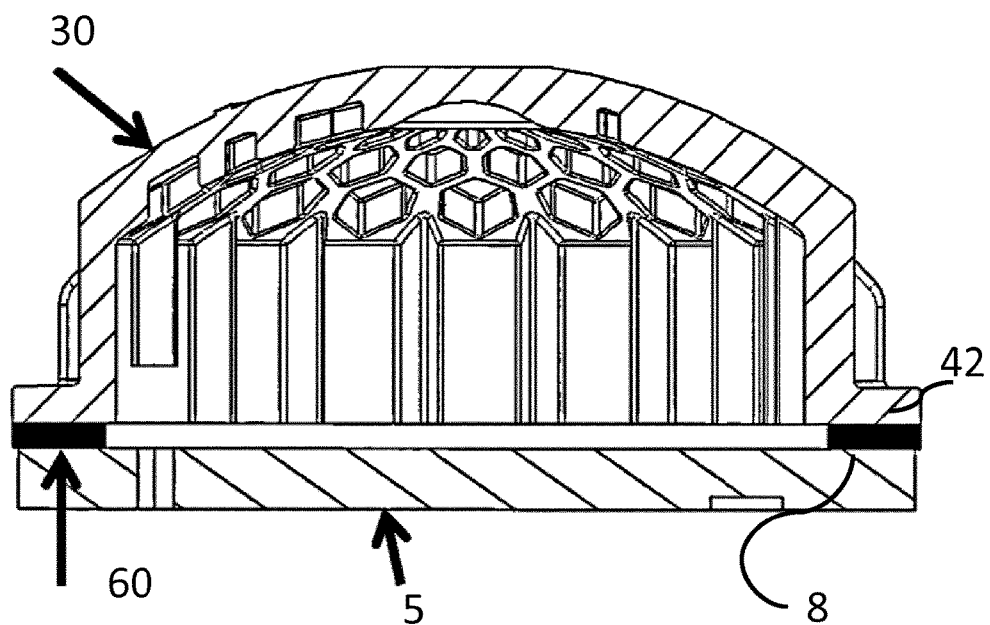
FIG. 2 shows an illustration of a pump housing according to the invention with the noise absorption cap.

FIGS. 1 and 2 show part of a motor vehicle vacuum pump 1 according to the invention having a pump housing 3. The pump housing 3 comprises a housing pot (not shown), which is screwed to a pump cover 5. It is possible to integrate into the housing pot a suction connection, via which a working medium, e.g. a gaseous medium, such as air or carbon dioxide, is drawn into a working chamber in the interior of the pump housing 3 when the motor vehicle vacuum pump 1 is driven.

The motor vehicle vacuum pump 1 is embodied as a vane pump having one or more vanes and a rotor. The rotor is connected in terms of drive to an electric motor. The general construction and operation of a vane pump are described in the publication WO2011/134448 A2, for example.

The motor vehicle vacuum pump 1 driven by the electric motor is operated without lubricating oil. The motor vehicle vacuum pump 1 operated without lubricating oil and driven by electric motor is installed in a motor vehicle, which can comprise a further drive in addition to an internal combustion engine drive, e.g. an electric motor drive.

When the internal combustion engine drive is switched off, the motor vehicle vacuum pump 1 driven by the electric motor is operated in the motor vehicle in order to produce a reduced pressure, e.g. in a brake booster embodied as a vacuum-type booster.

With its side facing away from a pump housing surface 8, the pump cover 5 defines the working chamber of the motor vehicle vacuum pump 1. Provided in the pump housing surface 8 is a passage opening 10, which allows a gaseous working medium to pass through from the working chamber of the motor vehicle vacuum pump 1. The passage opening 10 is embodied as a slotted hole and has the form of a circular arc in plan view.

The pump cover 5 with the pump housing surface 8 has essentially the form of a circular disk, on which three fastening recesses 11, 12, 13 are formed radially on the outside. The fastening recesses 11 to 13 delimit through holes, through which fastening means can be passed.

The pump cover 5 is formed from an aluminum material. The aluminum material is preferably a spray-compacted aluminum material. The spray-compacted aluminum material preferably has a silicon component of more than fifteen percent and contains particles of hard material. The aluminum material is preferably in the form of an alloy which, in addition to silicon, can also contain other elements, such as iron or nickel. The particles of hard material are preferably formed by silicon carbide.

A decoupling element 20 and a noise absorption cap 30 are attached to the pump housing surface 8 of the pump cover 5. The decoupling element 20 has substantially the same shape as the pump cover 5 but is formed from a different material than the pump cover 5. Radially on the outside, three fastening lugs 21, 22, 23 are formed on the decoupling element 20, said lugs, together with the fastening recesses 11 to 13 on the pump cover 5, being used to fasten the noise absorption cap 30 of the decoupling element 20 and of the pump cover 5 on the pump housing pot (not shown). Flexible bushes are placed on the fastening lugs or, alternatively, are formed integrally, and surround the fastening means, namely the screws.

The decoupling element 20 separates the noise absorption cap 30 vibrationally from the pump cover 5. For this purpose, the decoupling element 20 is formed in this example from a silicone rubber material which is relatively soft in comparison with the aluminum material from which the pump cover 5 is formed.

In addition to the noise decoupling function, the decoupling element 20 also performs a sealing function. The decoupling element 20 comprises a main body 25, which has essentially the form of a circular disk. Two annular beads are formed radially on the outside on both sides of the main body 25.

The decoupling element 20 furthermore performs a valve function. For this purpose, a valve 28 is integrated into the decoupling element 20. The valve 28 is embodied as a duckbill valve and is connected integrally to the main body 25 of the decoupling element 20. The duckbill of the valve 28 extends from the pump housing surface 8 into the interior of the noise absorption cap 30.

Radially on the outside, the noise absorption cap 30 has a fastening flange with three fastening lugs 31, 32, 33. The fastening lugs 31 to 33 are used for the passage of screws 35, 36, 37, with the aid of which the noise absorption cap 30, together with the decoupling element 20 and the pump cover 5, can be fastened on the pump housing pot (not shown) of the pump housing 3.

The noise absorption cap 30 is formed from a plastic material of a hardness different from the materials from which the pump cover 5 and the decoupling element 20 are formed.

Although the decoupling element 20 has bushes to receive the screws 35, 36, 37, the screws transmit structure borne noise between the pump cover 5 and the noise absorption cap 30.

FIG. 2 shows the solution according to the invention, which shows a connection between the two components, the pump cover 5 and the noise absorption cap 30, with the aid of a viscoelastic adhesive connector 60. In one illustrative embodiment, an acrylate material that offers double-sided adhesive bonding, of the kind that can be obtained under the brand name 3M-4959 F, is used. The acrylate adhesive core of the material forms a virtually inseparable unit with the two functional adhesive surfaces. Unlike conventional foam adhesive strips, the adhesive, which is viscoelastic throughout, forms a durable, stress-free composite structure. Moreover, the adhesive connectors are vibration-damping and, by virtue of their closed-cell structure, have a sealing effect.

By using the viscoelastic adhesive connector 60, noise transmission by the screwed joint between the pump and the noise absorption cap is prevented. The structure borne noise, which propagates at about 250 Hz with the respective harmonic components based on the rotational frequency of the pump, is suppressed by the adhesive connector in an effective manner that is very specific to frequencies below 1000 Hz.

Here, the frequencies caused by the vane rotations of the vacuum pump are damped very specifically by 10 dB, while the overall spectrum of the structure borne noise is damped by 5 dB. The fact that it is precisely frequencies in the lower range which are successfully reduced results in a significant improvement in terms of the subjective noise level.

An optimum sealing function is achieved by adhesive bonding with the metallic or plastic substrate without the sealing element, the adhesive connector, needing to have additional grooves or structures. The metallic surface of the pump cover 5 is joined flat to the plastic surface of the noise absorption cap.

The adhesive connector is a disk shaped ring which follows the outer contour of the pump cover and of the noise absorption cap. In FIG. 2, the adhesive connector is flush with the outer contour of the noise absorption cap and the circumferential rim 42 thereof. However, the adhesive connector can quite possibly be inserted and installed in such a way as to be set back. Because it is not absolutely necessary to follow the outer contour, only a sufficiently large joining surface being required, standard adhesive connectors with predetermined outside radii can be used.

Figure 3:
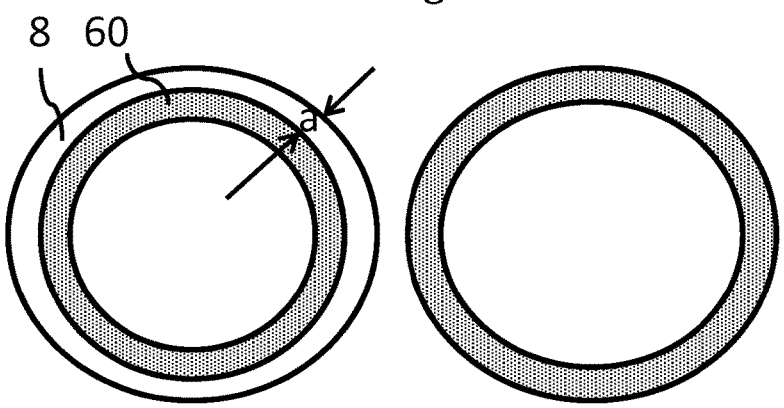
FIG. 3 shows an illustration of a pump cover surface upon which the noise absorption cap is installed.

FIG. 3 shows a pump cover surface 8 on which an adhesive connector is arranged, on the right with a border a and on the left with a flush edge. It can be seen that there is a higher degree of freedom in the design of the outer contour of the pump if the adhesive connector does not also have to be adapted to the contour.

In order to simplify assembly, a shallow groove, e.g. in the noise absorption cap in the surface of the circumferential rim, can be provided, allowing the adhesive connector to be positioned in a simple manner.

For fastening, sealing and noise decoupling, it is not necessary for the pump cover 5 and the noise absorption cap 30 to have fastening lugs 21, 31 etc. The pump cover and the noise absorption cap can be produced without these protrusions and thus occupy a reduced installation space.

In an alternative embodiment, use is made of fastening lugs and the shape of the adhesive connector is adapted in order to achieve a larger fastening surface.

An advantageous embodiment uses a circular ring about 3 mm thick composed of the abovementioned material.

It is entirely reasonable that person skilled in the art should interpret the term vacuum pump in a very wide sense, describing not only the production of a conventional vacuum but also the production of a reduced pressure that approaches a vacuum. The principle of the invention shown is not restricted to a reduced pressure to be achieved.

LIST OF REFERENCE SIGNS 1 motor vehicle vacuum pump
3 pump housing
5 pump cover
8 pump housing surface
10 passage opening
11 fastening recess
12 fastening recess
13 fastening recess
20 decoupling element
21 fastening lug
22 fastening lug
23 fastening lug
25 main body
28 valve
30 noise absorption cap
31 fastening lug
32 fastening lug
33 fastening lug
35 screw
36 screw
37 screw
42 circumferential rim
60 adhesive connector
a spacing

The invention claimed is:

1. A motor vehicle vacuum pump having a pump housing surface defining an outer perimeter on which a noise absorption cap is mounted, the noise absorption cap having a rim coupled with the pump housing surface adjacent the outer perimeter of the pump housing surface, a noise damping volume defined between the noise absorption cap and the pump housing surface, wherein a double-sided adhesive connector is arranged between the pump housing surface and the rim of the noise absorption cap, the double-sided adhesive connector extending adjacent to at least substantially the entire outer perimeter of the pump housing surface about the noise damping volume and sealing the noise damping volume, the adhesive connector performing both a sealing function and a fastening function in addition to a noise decoupling function.

2. The motor vehicle vacuum pump as claimed in claim 1, wherein the double-sided adhesive connector is formed integrally from a viscoelastic material.

3. The motor vehicle vacuum pump as claimed in claim 1, wherein the double-sided adhesive connector is produced from an acrylate.

4. The motor vehicle vacuum pump as claimed in claim 1, wherein the double-sided adhesive connector has a ring shape.

5. The motor vehicle vacuum pump as claimed in claim 1, wherein the double-sided adhesive connector is of almost circular design.

6. The motor vehicle vacuum pump as claimed in claim 1, wherein the double-sided adhesive connector has a plurality of surfaces extending outwardly therefrom in alignment with fastening lugs of the pump cover and of the noise absorption cap.

7. The motor vehicle vacuum pump as claimed in claim 1, wherein the double-sided adhesive connector is embodied and arranged in such a way that the noise absorption cap is acoustically decoupled from the pump housing cover.

8. The motor vehicle vacuum pump as claimed in claim 1, wherein the double-sided adhesive connector, the noise absorption cap and the pump housing surface differ in hardness, with the result that the noise absorption cap is vibrationally decoupled from the pump housing cover.

9. A vacuum pump for a vehicle, the vacuum pump comprising:
a pump cover having a pump housing surface being generally planar and defining an outer perimeter;
a noise absorption cap including a rim coupled with the pump housing surface adjacent the outer perimeter of the pump housing surface and extending continuously to define a noise damping chamber between the noise absorption cap and the pump housing surface; and
a double-sided adhesive connector disposed between the rim of the noise absorption cap and the pump housing surface and extending continuously adjacent the outer perimeter of the pump housing surface about the noise damping chamber and sealing the noise damping chamber and decoupling noise between the pump housing and the noise absorption cap.

10. The vacuum pump for a vehicle as set forth in claim 9 wherein the outer perimeter of the pump cover, the rim of the noise absorption cap and the double-sided adhesive connector each have a ring shape.

11. The vacuum pump for a vehicle as set forth in claim 9 wherein the double-sided adhesive connector is spaced inwardly from the outer perimeter of the pump cover.

12. The vacuum pump for a vehicle as set forth in claim 9 wherein the double-sided adhesive connector is aligned with the outer perimeter of the pump over.

13. The vacuum pump for a vehicle as set forth in claim 9 wherein the rim of the noise absoprtion cap defines an axial groove receiving said double-sided adhesive connector.

14. The vacuum pump for a vehicle as set forth in claim 9 wherein no screws interconnect the pump cover and the noise absorption cap.

15. The vacuum pump for a vehicle as set forth in claim 9 wherein a plurality of screws interconnect the pump cover and the noise absorption cap.

16. The vacuum pump for a vehicle as set forth in claim 9 wherein the noise absorption cap is of a plastic material and the pump cover is of an aluminum material.

17. The vacuum pump for a vehicle as set forth in claim 9 wherein the double-sided adhesive connector spaces the noise absorption cap from the pump cover.

18. The motor vehicle vacuum pump as claimed in claim 9, wherein the pump cover and the noise absorption cap each include a plurality of fastening lugs extending outwardly therefrom with each of the fastening lugs of the pump cover being in alignment with one of the fastening lugs of the noise absorption cap, and wherein the double-sided adhesive connector has a plurality of surfaces extending outwardly therefrom in alignment with the fastening lugs of the pump cover and the noise absorption cap.

19. The motor vehicle vacuum pump as claimed in claim 9 wherein the double-sided adhesive connector extends continuously and uninterrupted in a ring-shape adjacent to the outer perimeter of the pump housing surface.

* * * * *